July 29, 1969   J. OSTERMEYER   3,457,877
GAS TURBINE POWERPLANT FOR A LOCOMOTIVE
Original Filed Dec. 28, 1965
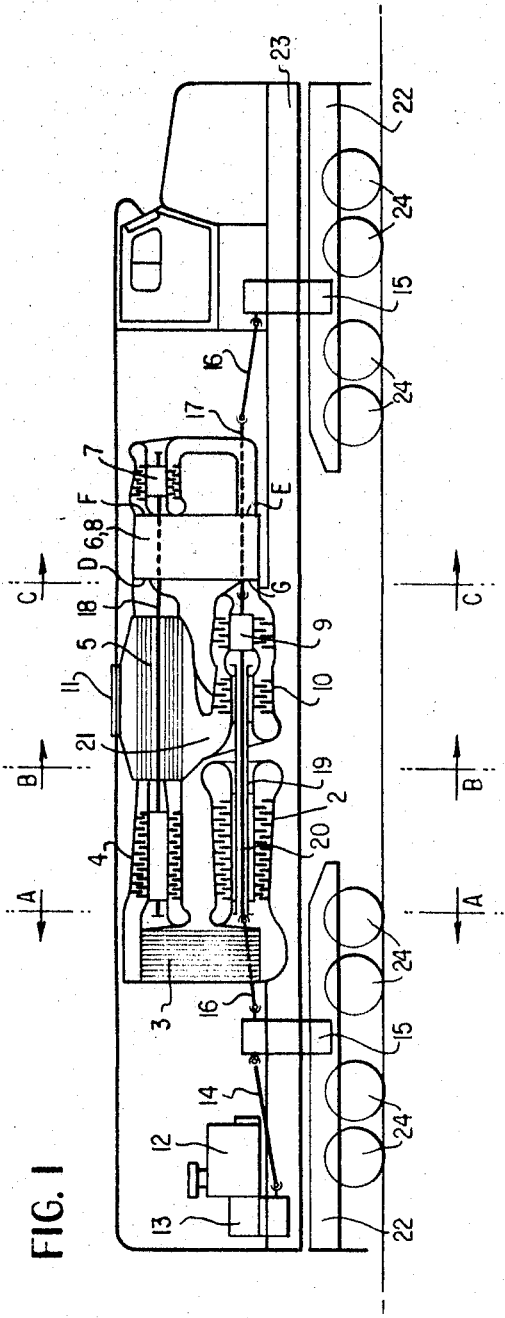
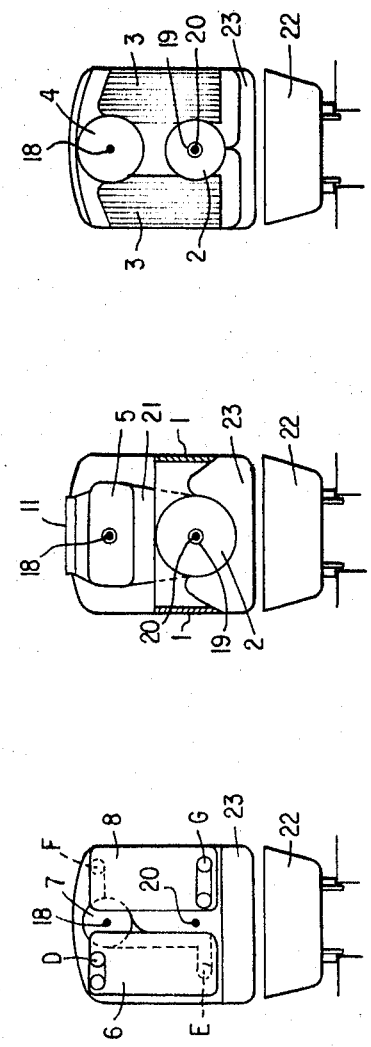
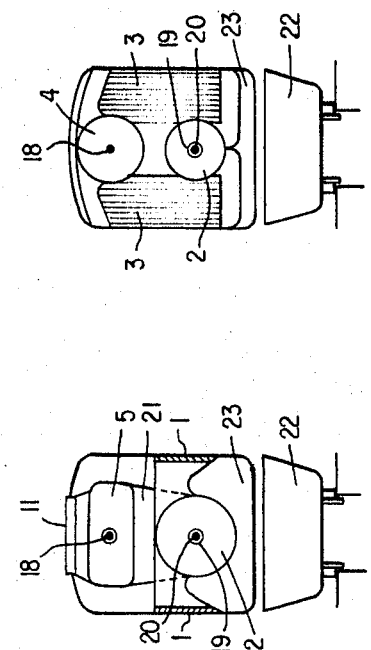
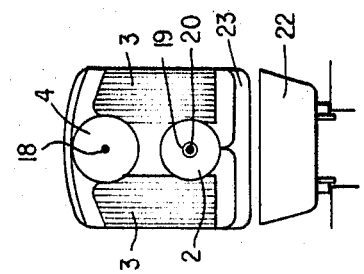
INVENTOR.
JÜRGEN OSTERMEYER
BY *James E. Bryan*
ATTORNEY

3,457,877
GAS TURBINE POWERPLANT FOR A LOCOMOTIVE

Jürgen Ostermeyer, Frankfurt-Berkersheim, Germany, assignor to Rheinstahl Henschel A.G., Kassel, Germany, a corporation of Germany
Continuation of application Ser. No. 516,989, Dec. 28, 1965. This application July 3, 1968, Ser. No. 751,656
Claims priority, application Germany, June 22, 1965, H 56,361
Int. Cl. B61c *5/00*
U.S. Cl. 105—61.5                                    5 Claims

ABSTRACT OF THE DISCLOSURE

This invention relates to a gas turbine locomotive, the powerplant of which includes the following sequence: low-pressure compressor, intermediate cooler, high-pressure compressor, air preheater, high-pressure combustion chamber, high-pressure compressor turbine, low-pressure combustion chamber, output turbine, low-pressure compressor turbine, and exhaust gas heat exchanger. The power transmission between the powerplant and the driving gear sets is effected mechanically by an output turbine shaft, a portion of which extends through a hollow shaft connecting the low-pressure compressor and the low-pressure compressor turbine.

---

This application is a continuation of Ser. No. 516,989, filed Dec. 28, 1965, now abandoned.

Known gas turbine locomotives with powerplants which operate according to the open process with compressor, combustion chamber and turbine, and in which a heat exchanger is provided for utilizing the exhaust gas heat to preheat the combustion air, have the disadvantage of only a moderate thermal efficiency especially at a low output power ratio which is unfavorable for railway vehicles. Also known are gas turbine circuits which result in a carnotizing of the gas turbine process by multi-stage changes in the conditions prevailing in different turbosets and combustion chambers. Such circuits require a large amount of space and, moreover, the partial load behavior is not particularly important therein because of the peculiarity of the powerplant operation.

It has been found that the most favorable process for mechanically driven vehicles, such as locomotives for example, is that according to the circuit mentioned above. With such a circuit, the unit is constructed so that the optimum efficiency is attained at approximately 50 percent output power ratio. Then, within the range of a 25 percent to 100 percent output power ratio, an efficiency is attained which corresponds approximately to that of a diesel engine and is, therefore, very favorable for vehicles.

Such a circuit, as described above, already has been provided for motor cars having a small power output up to approximately 400 BHP. However, predominantly radial flow turbo engines are used so that a compact arrangement of the aforementioned circuit may be realized in a simple manner.

The requirements to be met by a locomotive having high output differ fundamentally from those of vehicles having a small or medium output. Beyond a certain output, axial flow turbo engines must be used because of the higher throughput or rate of flow of the gas and air and the higher efficiency of the axial flow powerplants, as compared to radial flow powerplants, compensates for a decrease of the temperature ahead of the turbine without loss or impairment of the total thermal efficiency, thereby increasing the service life and safety of operation and also making possible the use of inexpensive fuels, such as heavy fuel oils rich in vanadium. With respect to long service life and high safety of operation, the use of large combustion chambers and a relatively low combustion chamber load or charge has been found to produce satisfactory results.

The present invention provides a locomotive construction employing axial flow turbo units and upright combustion chambers which makes possible a compact arrangement in a locomotive, in accordance with the aforementioned circuit and in accordance with the sequence described above. A free-running output turbine which is independent of the number of revolutions, or speed, of the compressor is used to mechanically drive sets of driving gears or drive wheels without torque conversion.

The desirable results of the invention are obtained by a combination of the following features:

(a) The high-pressure and low-pressure turbo compressor units are mounted superimposed with respect to each other in the vertical longitudinal central plane of the locomotive, the high-pressure unit being mounted above the low-pressure unit;

(b) The free-running output turbine is mounted coaxially with respect to the low-pressure compressor turbine and the low-pressure compressor, the output turbine shaft extending through the low-pressure compressor shaft, which latter is hollow, as well as through the low-pressure compressor and the low-pressure compressor turbine;

(c) The air intake side of the low-pressure compressor is mounted near the vehicle center, as is the pressure side of the high-pressure compressor;

(d) The low-pressure compressor turbine and the output turbine are mounted, with respect to the inlet and outlet sides thereof, in a mirror image-like manner to the low-pressure compressor;

(e) The high-pressure compressor turbine is mounted, with respect to the inlet and outlet side thereof, in the same direction as the high-pressure compressor;

(f) The high-pressure combustion chamber and a low-pressure combustion chamber are mounted side-by-side in the same vertical transverse central plane of the locomotive adjacent the inlet side of the output turbine;

(g) The high-pressure compressor turbine is mounted at the side of the combustion chambers facing away from the remainder of the powerplant;

(h) The heat exchanger is mounted between the pressure side of the high-pressure compressor and the combustion chambers above the low-pressure compressor turbine, and (i) The intermediate cooler is mounted at the pressure side of the low-pressure compressor and at the suction side of the high-pressure compressor.

Either a recuperative or a regenerative heat exchanger may be employed. In order to save space, cooling air for the intermediate cooler is forced through the vehicle in the transverse direction by means of fans mounted on horizontal shafts.

The universal joint shafts connected to the distributor gears in the trucks are of equal length and an intermediate shaft is employed for the purpose of compensating for the varying distances between the joints.

The output turbine shaft is constructed in a manner such as to be disengageable from the power transmission to the sets of driving gears on the drive wheels by means of disconnectable couplings mounted in the distributor gears. The exhaust gas duct connected to the low-pressure compressor turbine may be provided as a diffusor.

The invention will be further illustrated by reference to the accompanying drawings in which one embodiment of a gas turbine locomotive having a single cab is shown.

FIGURE 1 is a view in longitudinal section through the gas turbine locomotive and powerplant thereof, FIGURE 2 is a sectional view taken on line A—A of FIGURE 1, FIGURE 3 is a sectional view taken on line B—B of FIGURE 1, and FIGURE 4 is a sectional view taken on line C—C of FIGURE 1.

The turbo unit consisting of the low-pressure compressor 2 and the low-pressure compressor turbine 10, being connected by the low-pressure compressor shaft 19, is mounted on the bridge carrier 23 in the vertical longitudinal central plane of the locomotive. The high-pressure turbo unit consisting of the high-pressure compressor 4 and the high-pressure compressor turbine 7, being connected by the high-pressure compressor shaft 18, is mounted above the low-pressure turbo unit, also in the vertical longitudinal central plane of the vehicle. The free-running output turbine 9 which transmits the driving force mechanically directly to the driving gear sets 24 is mounted coaxially to the low-pressure turbo unit. The output turbine shaft 20 extends through the hollow low-pressure compressor shaft 19.

The air, which is taken in by the low-pressure compressor 2 through the air inlets 1 mounted in the side walls of the locomotive and which is compressed, flows to the intermediate cooler 3 mounted at the pressure end of the low-pressure compressor 2 and is drawn off, after cooling, at the upper end of the cooler by the high-pressure compressor 4. The air is further compressed in the high-pressure compressor 4 and the compression ratio of the high-pressure compressor 4 is approximately the same as that of the low-pressure compressor 2, the total compression ratio thus being the square of the compression ratio of a single compressor.

After leaving the high-pressure compressor 4, the air flows through the nests of boiler tubes of the exhaust gas-heated heat exchanger 5 and is heated therein. The air then enters the high-pressure combustion chamber 6 through the inlet D, positioned at the upper end of the high-pressure combustion chamber 6, and is heated in the combustion chamber by the fuel. The air leaves the high-pressure combustion chamber, as hot flue gas, at the lower end of the chamber 6 at the point E and the hot flue gas is then passed to the high-pressure compressor turbine 7, which latter is coaxially mounted with the high-pressure compressor 4. In the high-pressure compressor turbine 7, the enthalpy of the flue gas is reduced to the extent required to drive the high-pressure compressor 4.

After expansion in the high-pressure compressor turbine 7, the flue gas passes through the inlet F of the low-pressure combustion chamber 8 which is mounted in the same vertical transverse central plane as is the high-pressure combustion chamber 6. The high-pressure compressor shaft 18, connecting the high-pressure compressor 4 and the high-pressure compressor turbine 7, passes between the two combustion chambers 6 and 8 which are mounted in an upright position and side-by-side in the same vertical transverse central plane. The shaft 18 passes through the heat exchanger 5 in a tunnel provided therein.

The partially expanded flue gas is again heated in the low-pressure combustion chamber 8 and, after leaving the latter, passes at point G to the free-running output turbine 9 where the enthalpy thereof is reduced sufficiently for conversion into the required power output, the residual enthalpy being available in the low-pressure compressor turbine 10, mounted directly adjacent thereto, to drive the low-pressure compressor 2.

Upon the completion of the expansion in the low-pressure compressor turbine 10, except for a slight excess pressure which is necessary to overcome any resistance to flow, the flue gas, now named exhaust gas, flows through the exhaust gas duct 21, which may be provided as a diffusor, to the heat exchanger 5 where it heats the air discharged from the high-pressure compressor 4 and then escapes through the exhaust 11 provided in the roof of the locomotive.

The output turbine shaft 20 which extends through the hollow low-pressure compressor shaft 19 and, thus, through the low-pressure compressor 2 and the low-pressure compressor turbine 10 drives, through the universal joint shafts 16, the two distributor gears 15 which are mounted in the two trucks 22. An intermediate shaft 17 is mounted on the side of the powerplant where the two combustion chambers 6 and 8 are mounted in order to establish the desired equal length of the universal joint shafts 16 with respect to each other. The drive from the two distributor gears 15 to the driving gear sets 24 is effected in conventional manner either by means of longitudinally-positioned universal-joint drive shafts and bevel gear-axle drives, or spur gear drives, or a combination thereof.

For moving the locomotive during shunting operations and when running without train, as well as for the purpose of providing power for auxiliary equipment which must operate independently of the load condition of the main powerplant, an auxiliary diesel engine 12 is mounted at the rear end of the locomotive and operates through a transformer gear 13 and a universal-joint shaft 14 on the rearwardly-positioned distributor gear 15. Mounted in the upper portion of each of the two distributor gears 15 is a disconnectable coupling, not shown, which can be used to disconnect the power transmission between the output turbine 9 and the driving gear sets 24 during shunting operations and when running without train, when the auxiliary diesel engine 12 drives the locomotive, in order to avoid any turbine wheel friction and windage losses within the output turbine 9.

It will be obvious to those skilled in the art that many modifications may be made within the scope of the present invention without departing from the spirit thereof, and the invention includes all such modifications.

What is claimed is:

1. In combination, a locomotive, a gas turbine powerplant for said locomotive supported in a central portion of said locomotive and comprising high-pressure and low-pressure axial-flow turbo-compressor units mounted in substantially the same vertical longitudinal central plane of said locomotive, the high-pressure unit being mounted above the low-pressure unit, means connecting the units, an output turbine and the low-pressure compressor, an output turbine shaft extending through a hollow shaft connecting the low-pressure compressor and the low-pressure compressor turbine, the air intake side of the low-pressure compressor and the pressure side of the high-pressure compressor being positioned near the center of said locomotive, the low-pressure compressor turbine and the output turbine being mounted, with respect to the inlet and outlet sides thereof, in the same direction as the low-pressure compressor, the high-pressure turbine being mounted with respect to the inlet and outlet side thereof, in a symmetrical manner to the high-pressure compressor, high-pressure and low-pressure upright combustion chambers mounted side-by-side in substantially the same vertical transverse plane of the locomotive and being mounted adjacent the inlet side of the output turbine, the high-pressure compressor turbine being mounted at the side of the combustion chambers facing away from the rest of the powerplant, a heat exchanger positioned between the pressure side of the high-pressure compressor and the combustion chambers above the low-pressure compressor turbine, and the means connecting the units including an intermediate cooler positioned between the pressure side of the low-pressure compressor and the air intake side of the high-pressure compressor.

2. Apparatus according to claim 1 in which the heat exchanger is of the recuperative type.

3. Apparatus according to claim 1 in which the heat exchanger is of the regenerative type.

4. Apparatus according to claim 1 including trucks, one at each end of the locomotive distributor gears on each of said trucks, a universal-joint shaft being connected to each of said distributor gears and being driven by the output turbine, said shafts being of equal length.

5. Apparatus according to claim 1 including a diffusor exhaust gas duct connected to the low-pressure compressor turbine.

References Cited

UNITED STATES PATENTS

| | | | |
|---|---|---|---|
| 2,627,717 | 2/1953 | Waller | 60—39.17 |
| 2,683,964 | 7/1964 | Anxionnaz et al. | 60—39.17 |
| 2,707,865 | 5/1955 | Huebner | 60—39.16 |
| 2,793,497 | 5/1957 | Walter | 60—39.55 |
| 2,854,818 | 10/1958 | Fortmann et al. | 60—39.16 |
| 3,088,278 | 5/1963 | Franz | 60—39.16 |
| 3,209,536 | 10/1965 | Howes et al. | 60—39.16 |

FOREIGN PATENTS 648,410  1/1951  Great Britain.

JULIUS E. WEST, Primary Examiner

U.S. Cl. X.R.

60—39.16